US 12,083,768 B2

(12) United States Patent
Berard et al.

(10) Patent No.: US 12,083,768 B2
(45) Date of Patent: Sep. 10, 2024

(54) GLAZED ELEMENT, DEVICE WITH GLAZED ELEMENT AND ASSOCIATED THERMAL IMAGING CAMERA

(71) Applicant: SAINT-GOBAIN GLASS FRANCE, Courbevoie (FR)

(72) Inventors: Mathieu Berard, Paris (FR); Keihann Yavari, Margny-les-Compiegne (FR); Xavier Breniere, Voreppe (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 98 days.

(21) Appl. No.: 17/927,596

(22) PCT Filed: May 26, 2021

(86) PCT No.: PCT/FR2021/050955
§ 371 (c)(1),
(2) Date: Nov. 23, 2022

(87) PCT Pub. No.: WO2021/240112
PCT Pub. Date: Dec. 2, 2021

(65) Prior Publication Data
US 2023/0202145 A1 Jun. 29, 2023

(30) Foreign Application Priority Data

May 28, 2020 (FR) ...................... 2005625

(51) Int. Cl.
*H04N 23/23* (2023.01)
*B32B 3/26* (2006.01)
(Continued)

(52) U.S. Cl.
CPC ........ *B32B 17/10036* (2013.01); *B32B 3/266* (2013.01); *B61D 25/00* (2013.01); *H04N 23/23* (2023.01); *B32B 17/10761* (2013.01)

(58) Field of Classification Search
CPC ........ B32B 17/10036; B32B 17/10761; B32B 17/1055; B32B 17/10348;
(Continued)

(56) References Cited

U.S. PATENT DOCUMENTS 5,091,258 A * 2/1992 Moran .............. B32B 17/10174
428/524
6,132,882 A * 10/2000 Landin ................... B32B 27/08
428/436
(Continued)

FOREIGN PATENT DOCUMENTS

DE 10 2007 012993 A1 9/2007
GB 2 271 139 A 4/1994

OTHER PUBLICATIONS

International Search Report as issued in International Patent Application No. PCT/FR2021/050955, dated Jul. 23, 2021.
(Continued)

*Primary Examiner* — Timothy R Newlin
(74) *Attorney, Agent, or Firm* — Pillsbury Winthrop Shaw Pittman LLP

(57) ABSTRACT

A glazed element includes a vehicle glazing having an external main face intended to be oriented toward an exterior and an internal main face intended to be on a passenger compartment side, the glazing including a through-hole between the internal main face and the external face, the through-hole being delimited by a side wall of the glazing, and, in the through-hole, an insert made of material that is transparent in an LB range of wavelengths in an infrared spectrum ranging at least from 9.5 µm to 10.5 µm, the insert being made of material of refractive index n in the LB range, with an interior face and an exterior face, wherein the interior and exterior faces of the insert form a non-zero angle (Continued)

at an apex A, the insert having a thickness e that is variable and decreasing toward an upper edge of the glazing.

20 Claims, 4 Drawing Sheets

(51) Int. Cl.
 B32B 17/10 (2006.01)
 B61D 25/00 (2006.01)
(58) Field of Classification Search
 CPC ... B32B 17/10293; B32B 17/00; B32B 3/266; B32B 27/08; B32B 27/306; B32B 2605/08; B32B 2605/10; B61D 25/00; H04N 23/23; B60J 1/02; G01J 5/48; G01J 2005/0077
 See application file for complete search history.

(56) References Cited

U.S. PATENT DOCUMENTS

| | | | | |
|---|---|---|---|---|
| 2006/0082891 | A1* | 4/2006 | Milner | B60J 1/02 296/84.1 |
| 2015/0283797 | A1* | 10/2015 | Hennion | B32B 17/10889 156/101 |
| 2019/0022981 | A1* | 1/2019 | Labrot | G09F 3/203 |
| 2019/0248113 | A1* | 8/2019 | Kaplan | B32B 17/10036 |
| 2019/0263105 | A1* | 8/2019 | Briquet | B32B 38/145 |
| 2019/0283549 | A1* | 9/2019 | Oya | B32B 17/10935 |
| 2020/0047689 | A1* | 2/2020 | Kaplan | H04N 23/60 |
| 2020/0290318 | A1* | 9/2020 | Mannheim Astete | B32B 17/1077 |
| 2020/0391698 | A1* | 12/2020 | Fukuda | G01S 7/4813 |
| 2021/0237540 | A1* | 8/2021 | Kojima | B60J 1/001 |
| 2022/0063242 | A1* | 3/2022 | Pohlen | B32B 17/10 |
| 2022/0127187 | A1* | 4/2022 | Dreux | C03C 17/34 |
| 2023/0278309 | A1* | 9/2023 | Koran | B32B 17/10 428/172 |

OTHER PUBLICATIONS

Osipkov, AS., et al., "Surface hardening of optic materials by deposition of diamond like carbon coatings from separated plasma of arc discharge," IOP Conf. Series: Materials Science and Engineering 74, (Year: 2015) 012013, 9 pages.

* cited by examiner

[FIG.1]
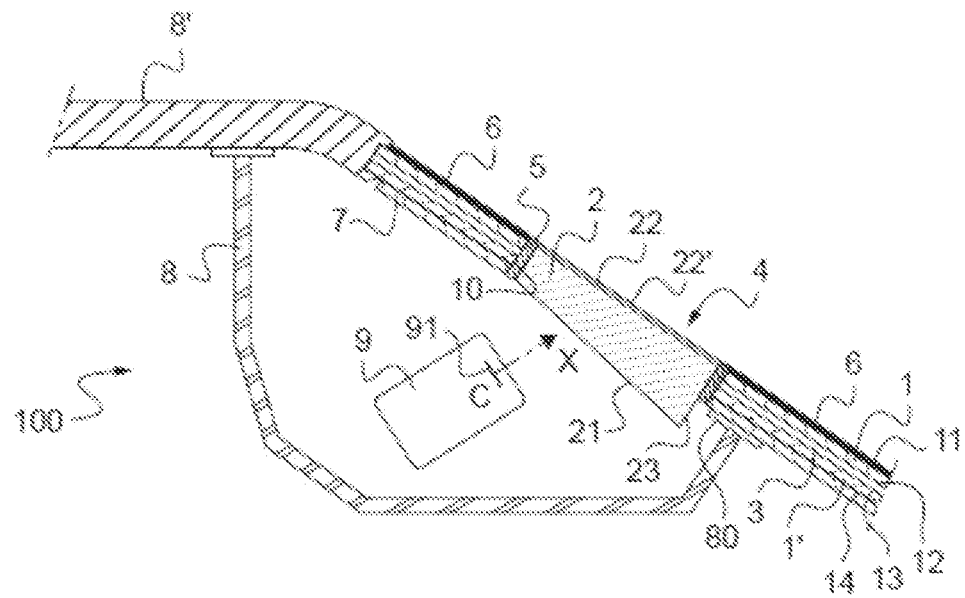
[FIG.2]
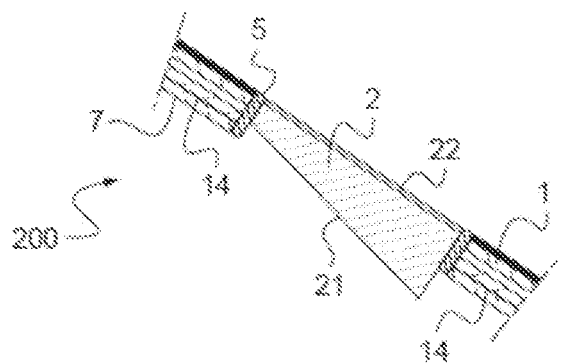
[FIG.3]
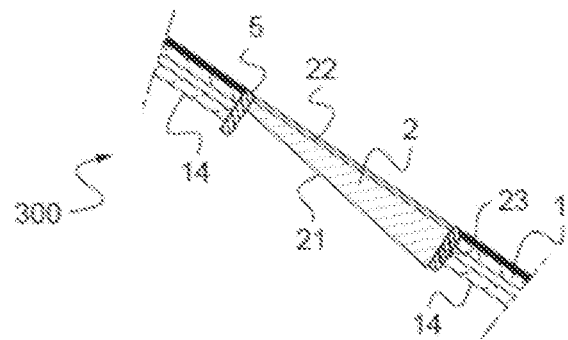

[Fig. 4A]
[Fig. 4B]
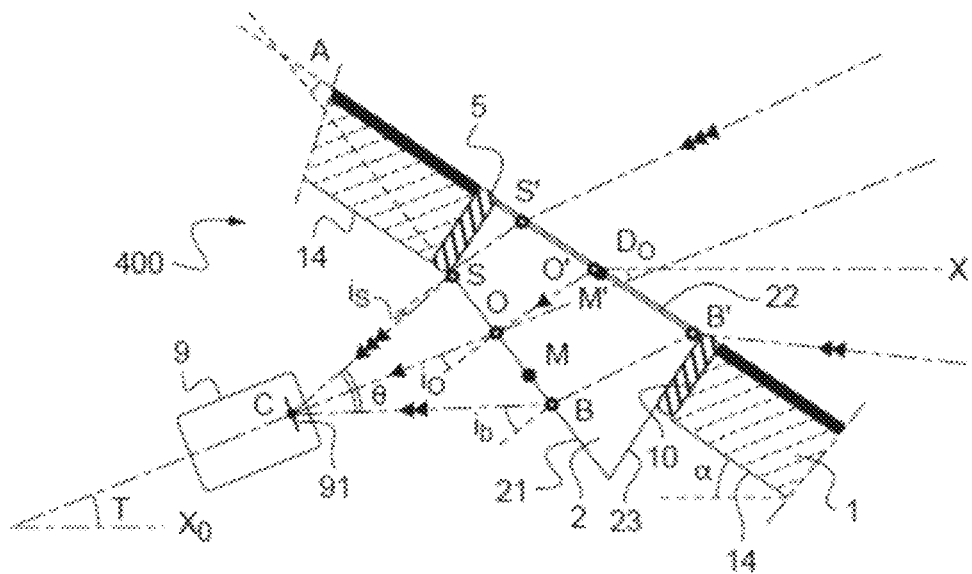

[FIG.5]
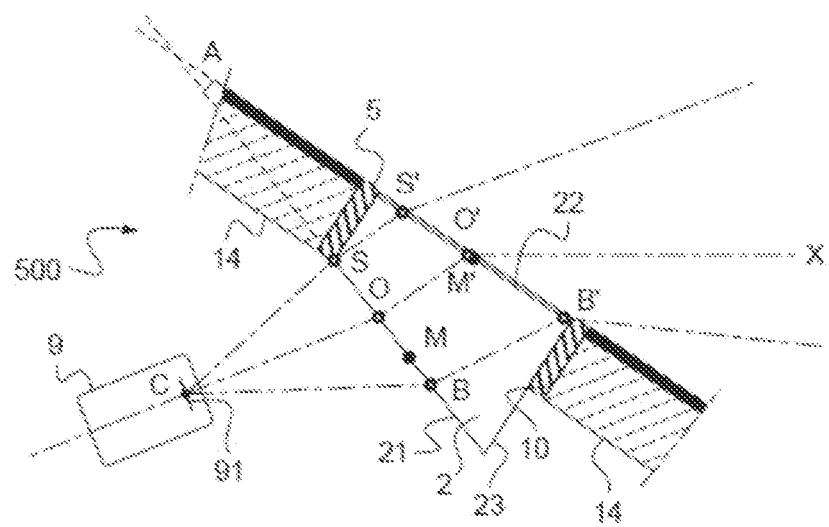
[FIG.6]
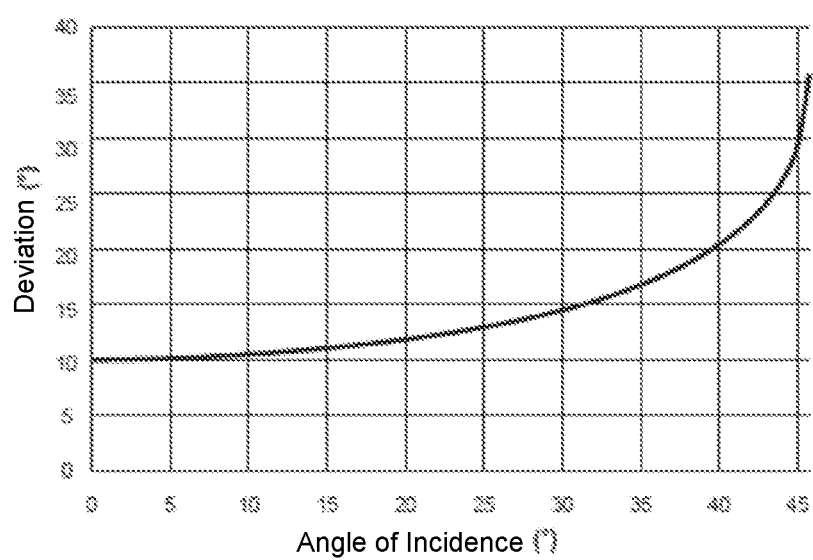

[FIG.7]
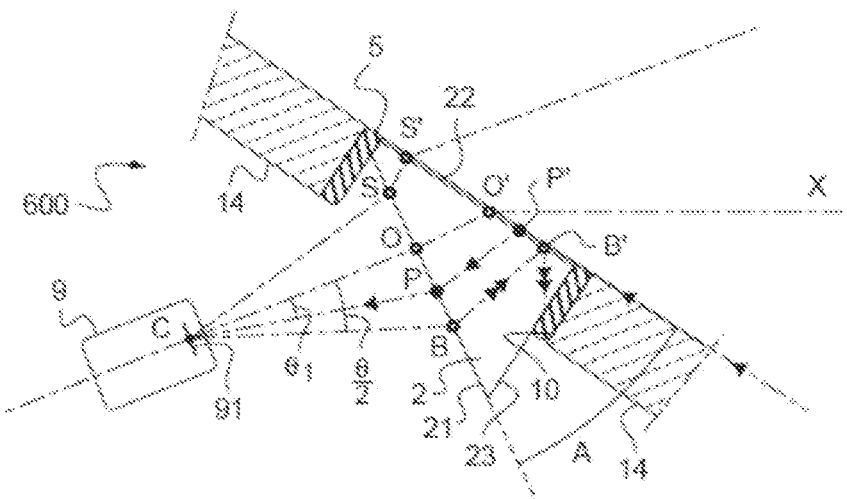
[FIG.8]
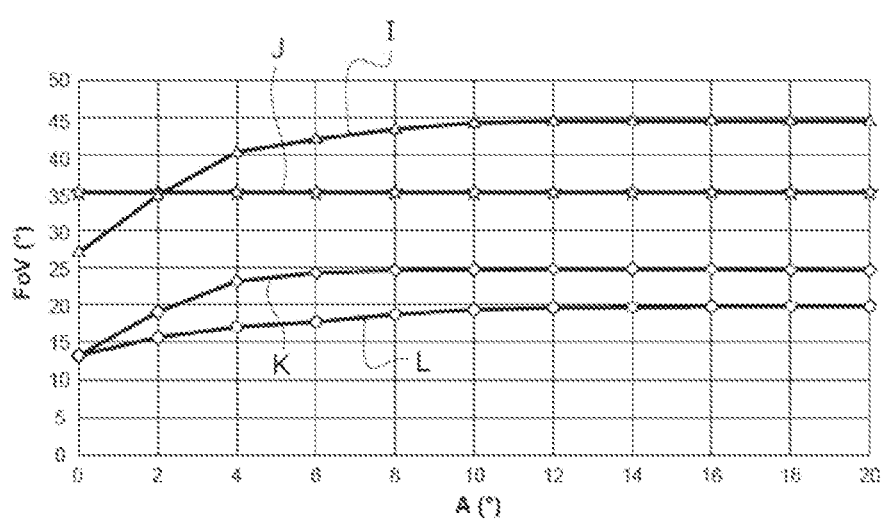

GLAZED ELEMENT, DEVICE WITH GLAZED ELEMENT AND ASSOCIATED THERMAL IMAGING CAMERA

CROSS-REFERENCE TO RELATED APPLICATIONS

This application is the U.S. National Stage of PCT/FR2021/050955, filed May 26, 2021, which in turn claims priority to French patent application number 2005625 filed May 28, 2020. The content of these applications are incorporated herein by reference in their entireties.

The invention relates to a vehicle glazing, particularly a windshield, a device with such a glazing, a thermal camera for viewing information.

Vehicle glazings and the associated technology are in continuous development, particularly in order to improve safety.

In particular, patent GB 2271139 proposes a windshield having a laminated glazing with, in a central portion and near the upper longitudinal edge, an opening filled by an insert made of material that is highly transparent to thermal infrared, more specifically made of zinc sulfide (ZnS) of at least 50% transmission from 5 to 15 μm.

A dedicated thermal camera coupled to a screen visible to the driver is in the passenger compartment facing the insert. The hole is circular, and the insert is a disk bonded to the walls of the hole.

In manufacturing terms, the hole is produced before the windshield glass goes through the autoclave.

The performance of such a device for detecting objects or persons can be improved.

To that end, the present invention relates to a glazed element that comprises:

a vehicle glazing (particularly laminated and/or curved), particularly automobile (car, truck, public transport: bus, coach, etc.) or railway (in particular at maximum speed of at most 90 km/h or at most 70 km/h, in particular subways, tramway), particularly windshield, rear window, side glazing, of a given thickness E1 (subcentimetric, particularly at most 5 mm for an automobile windshield), the glazing having an external main face (called F1) intended to be oriented toward the exterior (oriented toward the exterior in mounted position) and a main face (the most) internal intended to be on the passenger compartment side—the passenger compartment side in mounted position—(said face called F4 if laminated glazing, or called F2), the glazing comprising, preferably in a peripheral area which preferably is on the upper portion of the glazing (preferably on the upper longitudinal edge particularly in a central region of the upper portion), a through-hole between the internal face and the external face, the hole delimited by a side wall of the glazing, particularly a through-hole forming a peripheral notch or closed hole (surrounded by the wall), in particular the hole of constant diameter or larger diameter on the interior face than on the exterior face, particularly of convex section in particular circular or oval or ellipsoidal or even rectangular, square or hexagonal, in particular of diameter of at most 40 mm or 35 mm (greater than or equal to the constant or variable diameter of the insert)

in said through-hole, an insert made of material transparent in an LB range of wavelengths in the infrared spectrum above 2.5 μm, ranging at least from 9.5 μm to 10.5 μm and preferably from 8 to 12 μm, the insert being made of material of refractive index n in the LB range, particularly from 1.35 to 4.5 with an interior face—intended to be oriented or oriented toward the passenger compartment in mounted position—and an exterior face—(particularly flush with or set back from the external face) intended to be oriented or oriented toward the exterior in mounted position.

The interior and exterior faces (non-parallel, preferably flat) of the insert form a non-zero angle at the apex A, the insert having a variable thickness e decreasing toward the upper edge of the glazing (the edge of the glazing farthest from the ground, particularly the longitudinal edge particularly of a windshield)—in mounted position (on the vehicle)—particularly the glazing having an inclination defined by an angle α relative to the horizontal (in mounted position).

The thickness e is preferably at most 1 cm or subcentimetric, particularly in a range of from 3 to 10 mm. e1 may be defined as the minimum thickness, at the upper edge (furthest from the ground), and e2 the maximum thickness at the lower edge (closest to the ground).

The insert (tapered upward) according to the invention enables the rays to be deflected downward, the value of the deflection depending on the angle of incidence of the rays on the insert, resulting in increasing the vertical field of view of the thermal camera. The horizontal field of view of the thermal camera is unchanged.

The insert according to the invention makes it possible to increase the vertical field of view of the thermal camera, particularly downward, and therefore makes it possible to have a final or effective vertical field of view (defined after refraction by the insert) that is wide even starting from an initial small field of view of the thermal camera, which makes it possible to use a smaller insert than an insert with parallel faces and/or a thermal camera with a small field of view and therefore likely to be less expensive and or more compact and therefore of easier integration.

Advantageously, the interior face forms a non-zero angle AO with (the local plane of) the internal face, AO particularly being equal to A±2°, and/or the exterior face is in a plane parallel or coplanar with (the local plane of) the external face or forming an angle of at most 2° with (the local plane of) the external face. Preferably AO is equal to A and/or the exterior face is coplanar with the external face. Preferably, A is at least 2° and at most 30°.

In other words, the decrease in thickness of the insert toward the top (away from the ground) is preferably obtained by the tapered shape of the interior face, all or part of which may project from the internal face.

Preferably the exterior face may be flush (with the local plane) with the external face of the glazing—in the area adjacent to the insert—(therefore locally the exterior face and the external face are coplanar) or may be set back (from the local plane of) from the external face of the glazing—in the area adjacent to the insert—particularly by no more than 1 mm (locally the exterior face and the external face are in planes preferably parallel or that coincide).

The insert being preferably circular or quasi-circular in shape. The exterior face is preferably circular or quasi-circular in shape. The interior face is preferably circular or quasi-circular, particularly ellipsoidal in shape.

The diameter of the exterior face of the insert may be at most 35 mm or 25 mm and particularly at least 5 mm or 8 mm.

The exterior face of the insert may be inscribed within a rectangle (including square) of width Wi and height Di with Di/Wi ratio of at least 0.8 or 0.9 and at most 1.1 or 1.2, preferably Di equal to Wi, with Di at most 35 mm or 25 mm, particularly at least 5 mm or 8 mm, defining a center M' which is the intersection of the diagonals of said rectangle.

The diameter of the interior face of the insert may be at most 35 mm or 25 mm and particularly at least 5 mm or 8 mm.

The interior face of the insert may (also) be inscribed within a rectangle (including square) defining a center M which is the intersection of the diagonals of said rectangle.

The interior face of the insert may, at the highest point (far from the ground), emerge from the internal face (or be flush therewith), and at the lowest point (close to the ground) be flush with the internal face of the glazing (or be set back therefrom by at most 5 mm).

Preferably, between (the side face of) the insert and the side wall delimiting the hole of the glazing, there are means of attaching the insert (and also preferably sealing against liquid water or even gas), particularly comprising a gasket, a ring made of organic or (organic/inorganic hybrid) polymer material and/or flexible material, for example polycarbonate. The ring may be bonded to the side wall. The insert may also be bonded directly to the side wall.

Naturally, the side face of the insert facing the side wall of the glazing preferably has sufficient thickness to facilitate maintenance, for example at least 3 mm (toward the top of the glazing).

The transverse cross-section of the insert (passing through a plane perpendicular to the interior and exterior faces passing through M and M') is for example quadrilateral in shape.

In order to specify the position of the thermal camera relative to the insert, a centerline may be defined as being the projection in the plane of the internal face of the glazing of the vertical line passing through this center M, (this line runs from the top edge to the bottom edge of the glazing, thus dividing the interior face into two areas). The thermal camera may be positioned so that (or "is centered", meaning) the optical axis X meets the interior face at less than 5 mm or 2 mm from the center line.

The angle α of the glazing relative to the horizontal particularly a road vehicle windshield, may typically be between 21° and 36° relative to the ground.

In the present description in mounted position designates in position mounted in the vehicle particularly a road vehicle.

As regards the material of the insert, the LB range is from 9.5 μm to 10.5 μm, preferably from 8 to 12 μm or 13 μm. Preferably, the material of the insert has an infrared optical transmission of at least 30% or at least 40% and better still at least 60%, 65% or 70% in this LB range.

Furthermore, according to the invention the material of the insert may be germanium or a ZnS (conventional).

Moreover, according to the invention, the material of the insert may be transparent in the visible region at a reference wavelength of between 500 nm and 600 nm and even from 540 or 550 nm to 600 nm, better within a B range of 550 to 600 nm, preferably with a light transmission of at least 25% and better at least 30% or better still 40%, 60% at the reference wavelength and better in the B range.

Contrary to conventional ZnS, which is opaque in the visible spectrum, the material of the insert according to the invention may also advantageously be transparent in the visible region, which makes it possible:
- to identify defects in the crystal in a simple way, thus limiting the scrap rate
- to pre-focus well the optical system (with a so-called thermal camera sensitive in the reference wavelength)

Light transmission is measured for the reference wavelength or better for the B range with a spectrophotometer such as the Perkin Elmer Lambda-35.

Light transmission may be measured according to the standard ISO 9050:2003 using the D65 illuminant, and be the total transmission (in particular integrated over the visible region and weighted by the sensitivity curve of the human eye), taking into account both direct transmission and possible diffuse transmission, the measurement being carried out, for example, using a spectrophotometer equipped with an integrating sphere, the measurement at a given thickness subsequently being converted, if appropriate, to the reference thickness of 4 mm according to the standard ISO 9050:2003.

Infrared optical transmission is measured for the LB range by a fourier-transform spectrophotometer such as the BrukerVertex-70 or by a spectrophotometer such as the Perkin Elmer Lambda 900.

Advantageously, the insert material has:
- an infrared optical transmission of at least 30%, at least 40% and better at least 60%, 65% or 70% in the LB range, particularly a variation in infrared optical transmission of at most 5% or 3% or 2% (flat spectrum) in the LB range.
- and even preferably a light transmission of at least 25%, and better at least 30% or even 40%, 60% in the B range, particularly a light transmission variation of at most 5% or 2% (flat spectrum) in the B range.

The insert is for example colorless or tinted (though still transparent) particularly yellow, orange.

The material of the insert may be polished (interior and/or exterior face).

Advantageously, the material of the insert according to the invention may be chosen from a material (preferably polycrystalline), particularly obtained by chemical vapor-phase deposition) as follows:
- a zinc compound comprising selenium and/or sulfur, or
- a compound comprising a barium fluoride
- even a compound comprising thallium bromide iodide such as KRS-5 (Thallium Bromide-Iodide).

And in particular, the material of the insert is chosen from:
- a compound comprising a multispectral zinc sulfide, in particular obtained after hot isostatic pressing (processing by isostatic pressing at a temperature preferably of at least 800° C.), particularly including selenium, such as $ZnS_xSe_{1-x}$ where x is preferably at least 0.97 and better at least 0.99 and even better at least 0.998
- a compound comprising a zinc selenide, particularly ZnSe,
- a compound comprising a barium fluoride at 1 and preferably at most 0.25, better at most 0.03 or still better at most 0.005, in particular $BaF_2$.

Multispectral (MS) grade zinc sulfide is a recent material. It may be polycrystalline and obtained by using (particularly after formation by chemical vapor deposition CVD from zinc vapor and $H_2S$ gas) hot isostatic pressing (HIP).

The transmission of the multispectral zinc sulfide may be broad-spectrum with a flat spectrum. The transmission is in particular more than 60% from 0.5 μm to 10 μm.

The refractive index of the multispectral ZnS is for example between 2.1 and 2.3 in the LB range and in the visible region between 2.3 and 2.6.

The multispectral and preferably polycrystalline zinc sulfide, is advantageous in view of its combination of optical, mechanical and chemical resistance properties.

The most well-known polycrystalline multispectral zinc sulfide is Cleartran™.

The multispectral ZnS product sold by the II-VI or Crystaltechno Ltd. Company may be mentioned.

The Hellma, II-VI or Crystaltechno Ltd. Companies may be mentioned as sellers of polycrystalline zinc selenide.

Advantageously, in order to improve the mechanical strength, the insert may comprise a mechanical and/or chemical protective layer on the exterior face and optionally on the interior face.

The mechanical and/or chemical protective layer (preferably a single-layer or multilayer coating) may be chosen from at least one of the following layers:
- a layer comprising a zinc sulfide (particularly ZnS) in particular on a $ZnS_xSe_{1-x}$ insert, particularly ZnSe, for mechanical protection,
- a diamond layer, preferably amorphous for its properties of adhesion to the crystal of the insert, particularly of a thickness of at least 10 nm or 20 nm and preferably from 50 nm to 300 nm and even at most 100 nm.
- a layer of diamond-like carbon (DLC), that is a diamond-like carbon based layer, preferably amorphous, particularly of a thickness of at least 10 nm or 20 nm and preferably from 50 nm to 300 nm and even at most 100 nm.

The addition of a sufficiently thin layer of ZnS on ZnSe does not degrade the transmission and guarantees corrosion resistance similar to solid ZnS. One example of such a product is TUFTRAN™ from Rohm & Haas.

For example, the material such as $ZnS_xSe_{1-x}$ (having ZnS) may be coated by a layer of ZnS to protect it against acids and other specific solvents such as methanol, etc.

As an alternative to the ZnS, a diamond layer (or a DLC layer) may be deposited for example by chemical-phase deposition (particularly PECVD) or vapor-phase deposition (VPD) without degrading the transmission and while guaranteeing even greater corrosion resistance. One example of manufacturing is described in the publication by Osipkov et al. IOP, conf. Ser. Material Science and Engineering 74 (2015) 012013.

The insert may therefore be coated with a functional overlay (anti-scratching, anti-fogging, etc.) of a different refractive index n is the index of the material of dominant thickness.

A plate, particularly of a thickness of 1 to 3 mm and even from 1.5 to 2.5 mm, may be bonded onto the internal face of the glazing (F2 or F4 if laminated glazing). For example, it is of plastic optionally reinforced (fibers, etc.) for example polycarbonate (PC), poly(methyl methacrylate) (PMMA), polyethylene (PE), polypropylene (PP), polyamide (PA66), acrylonitrile butadiene styrene (ABS) and ABS-PC alloys thereof, polystyrene (PS), acrylonitrile styrene acrylate (ASA), based on formaldehyde polymer (polyoxymethylene POM), polybrominated terphenyl (PBT), preferably reinforced with glass fibers for even greater strength, particularly the PA66 GF30 (30% glass fibers).

This plate may be used to attach the thermal camera and/or a housing. It may have a hole to the right of said through-hole.

It may also carry functional elements for example a camera in the visible region and/a LIDAR or any other sensor (rain, light, etc.). It includes as many holes as necessary for the sensor(s) (hole for the camera in the visible region, for LIDAR, etc.).

The glazing according to the invention may be a laminated glazing, particularly a vehicle windshield (road vehicle, automobile in particular), particularly curved, comprising a first glass sheet with said external main face called F1 and an opposite main face (called F2) and a second glass sheet with said internal main face called F4 interior side of the passenger compartment (and the opposite main face F3), the first and second glass sheets being bonded by a lamination interlayer, particularly acoustic and/or tinted, made of a polymer material particularly organic (particularly thermoplastic).

In particular, the laminated glazing comprises:
- a first glass sheet, optionally clear, extra-clear or tinted, particularly gray or green, preferably curved, forming the exterior glazing, with first and second main faces respectively called face F1 and face F2, if a motor vehicle, of thickness of preferably at most 2.5 mm, even of at most 2 mm—particularly 1.9 mm, 1.8 mm, 1.6 mm and 1.4 mm—or even of at most 1.3 mm or at most 1 mm;
- an optionally clear, extra-clear or tinted, particularly gray or green, lamination interlayer made of a preferably thermoplastic polymeric material and better still of polyvinyl butyral (PVB), preferably if a motor vehicle of thickness of at most 1.8 mm, better still of at most 1.2 mm and even of at most 0.9 mm (and better still of at least 0.3 mm and even of at least 0.6 mm), particularly set back from the edge face of the first glazing by at most 2 mm and set back from the edge face of a second glazing by at most 2 mm, the lamination interlayer optionally having a transverse cross-section decreasing in wedge shape from top to bottom of the laminated glazing (particularly a windshield),
- a second glazing made of preferably curved and preferably clear or extra-clear or even tinted mineral glass forming the interior glazing, with third and fourth main faces, if a motor vehicle, preferably of thickness smaller than that of the first glazing, even of at most 2 mm—particularly 1.9 mm, 1.8 mm, 1.6 mm and 1.4 mm—or even of at most 1.3 mm or at most 1 mm, the thickness of the first and second glazings preferably being strictly smaller than 4 mm and even than 3.7 mm, The interior and/or exterior glass may be neutral (without coloration) or (slightly) tinted, particularly gray or green, such as the TSA glass from Saint-Gobain Glass. The interior and/or exterior glass may have undergone a chemical or heat treatment of the hardening or annealing type or a tempering (particularly in order to obtain better mechanical strength) or be semi-tempered.

Without going beyond the scope of the invention, the interlayer can of course comprise several laminations of thermoplastic material of different natures, for example of different hardnesses to provide an acoustic function, as described for example in publication U.S. Pat. No. 6,132,882, particularly a set of PVB laminations of different hardnesses. Similarly, one of the glass laminations can be thin compared to the thicknesses conventionally used.

According to the invention, the interlayer can have a wedge-shape, particularly in view of an HUD (Head Up Display) application. One of the laminations of the interlayer can also be batch-tinted.

As a common lamination interlayer, other than PVB, a flexible polyurethane PU can be mentioned, a thermoplastic without plasticizer such as ethylene-vinyl acetate copolymer (EVA), an ionomer resin. These plastics have for example a thickness of between 0.2 mm and 1.1 mm, particularly 0.3 and 0.7 mm.

The lamination interlayer may comprise another functional plastic film (transparent, clear or tinted) for example a polyethylene terephthalate PET film bearing a layer that is athermal, electroconductive, etc., for example on a PVB/functional film/PVB between the faces F2 and F3.

The transparent plastic film can have a thickness of between 10 and 100 µm. The transparent plastic film can more broadly be made of polyamide, polyester, polyolefin (PE: polyethylene, PP: polypropylene), polystyrene, polyvinyl chloride (PVC), polyethylene terephthalate (PET), poly(methyl methacrylate) (PMMA) or polycarbonate (PC). A clear film is preferred, in particular PET.

Use may be made for example of a clear coated PET film, for example XIR from Eastman, a coextruded PET/PMMA film, for example of the SRF 3M® type, but also numerous other films (for example made of PC, PE, PEN, PMMA, PVC), which are visually as transparent as possible and which are not modified, in the autoclave, as regards their surface and their consistency.

In order to limit heating in the passenger compartment or to limit the use of air conditioning, at least one of the glass sheets (preferably the exterior glass) is tinted, and the laminated glazing can also comprise a layer which reflects or absorbs solar radiation, preferably on face F4 or on face F2 or F3, in particular a transparent electrically conductive oxide layer, known as a TCO layer, (on face F4) or even a stack of thin layers comprising at least one TCO layer, or stacks of thin layers comprising at least one silver layer (on F2 or F3), the or each silver layer being arranged between dielectric layers.

The layer (silver) on face F2 and/or F3 and TCO layer on face F4 can be combined.

The TCO layer (of a transparent electrically conductive oxide) is preferably a layer of fluorine-doped tin oxide ($SnO_2$:F) or a layer of mixed indium tin oxide (ITO).

Naturally, the most desirable application is that the glazing be a windshield for a road vehicle (automobile) or even railroad (moderate speed).

The glazing according to the invention may comprise at least a first glass sheet comprising on a main face an opaque layer (masking) particularly an enamel (black, etc.) at the edge of the through-hole (so as to mask the camera(s) for example).

The laminated glazing according to the invention may comprise a first glass sheet comprising on a main face (for example face F2) an opaque layer (masking) particularly of enamel (black, etc.) at the edge of the through-hole (so as to mask the camera(s) for example) and/or a second glass sheet comprising on a main face (for example face F3 or F4) an opaque layer (masking) particularly of enamel (black, etc.) at the edge of the through-hole (so as to mask the camera(s) for example).

A masking layer may also be provided on at least one of the main faces of the lamination interlayer, particularly PVB.

The invention further relates to a device comprising:
the glazed element as defined previously, the glazing particularly having an inclination defined by an angle α relative to the horizontal in mounted position (in the vehicle), particularly a windshield
a so-called thermal camera, arranged on the internal face side, facing the insert, in such a way as to receive electromagnetic radiation after passage through the insert, the thermal camera comprising a pupil (input), particularly circular, an infrared detection system in the LB range for example by microbolometry, particularly without cryogenic cooling (and an objective lens), the thermal camera being defined by a vertical angle of view θ of at least 10° or 20° and in particular at most 60° or 50° or 40°.

Infrared detection with a maximum sensitivity in the LB range and even a low sensitivity above 15 or 14 µm and below 7 or 6 µm is preferred.

As an example of thermal camera, the Atom®1024 from the Lynred USA company may be mentioned.

The thermal camera may be further defined by an optical axis X passing through the center C of the pupil, the thermal camera forms a positive angle of inclination T with a horizontal axis X0, upstream from the internal face, the camera being tilted upward (in mounted position).

Since the insert with non-parallel faces pulls all the rays downward, the optical axis of the thermal camera is also deflected downward (after passing through the insert). In other words, if the thermal camera before the insert is looking at the horizon (if the optical axis is horizontal) the thermal camera will be looking downward after the insert which is not the optimal solution in terms of total angle of view, because there is a particular risk of pointing the thermal camera toward the hood of the vehicle. It is therefore particularly interesting to compensate for this by orienting the thermal camera upward so that after the insert the optical axis X is again horizontal or nearly so.

The lowest ray coming from the center C of the pupil arriving with an angle of incidence greater than the highest ray coming from the center C of the pupil, the lowest ray is always more deflected downward than the highest ray, which gives the overall effect of increasing the vertical angle of view of the thermal camera.

Advantageously, by defining a ray (central) R incident to the exterior face in a horizontal direction, the ray R then being refracted during its passage through the insert, $D_0$ being the angle of deflection by the insert of the ray R and defined by:

$$D_O = \frac{\pi}{2} - \alpha + \sin^{-1}\left(n \sin\left(A - \sin^{-1}\left(\frac{\sin\left(\frac{\pi}{2} - \alpha\right)}{n}\right)\right)\right) - A \quad \text{[Math 1]}$$

T is chosen such that T equals $D_0 \pm 10°$ while remaining positive (thus a positive value between $D_0-10°$ and $D_0+10°$), and preferably $D_0 \pm 5°$ or $D_0 \pm 1°$.

$D_0$ is therefore defined from a central ray passing through the center C of the pupil (making an angle $i_0$ at a point O of the interior face) leaving at a point O' of the exterior face, thus forming said angle $D_0$ with the axis X.

Advantageously it may be provided that T forms and angle of at most 30°, and better at most 20° with the horizontal X0.

The choice of the angle at the apex A may be dictated by the following consideration: if A is too large then the lowest rays (coming from the center C of the pupil) do not exit the insert and are trapped by total internal reflection (confined within the insert) which will limit the possible increase of the field of view. There is therefore an optimal angle $A_{max}$ beyond which there is no improvement.

Preferably then, a range of values is determined from $A_i$ (to $A_{max}$) that satisfy the following equation:

$$A_i \leq \frac{\sin\left(\frac{\pi}{2} + \frac{\theta}{2} - T' - \alpha - A_i\right)}{n} + \sin^{-1}\left(\frac{1}{n}\right) \quad \text{[Math 2]}$$

this range $A_i$ being determined by iteration
A being set within a range of from a non-zero value to $A_i \pm 2°$.

T' being an angle of the thermal camera with the horizontal and is zero (the thermal camera is horizontal) or is preferably equal to T (tilted upward).

It involves a recursive equation that defines a calculation that terminates (with at least one solution, here with a range of solutions).

A machine may execute the calculations for example by an optimization method such as the gradient-descent algorithm.

The execution of the calculation will generate cascading recursive calls while ensuring that this cascade of calls ends.

In other words, by defining the lowest ray coming from the center C of the pupil forming an angle is with the interior face.

$$i_B = \frac{\pi}{2} + \frac{\theta}{2} - T - \alpha - A \quad \text{[Math 3]}$$

And $$A \leq \frac{\sin i_B}{n} + \sin^{-1}\left(\frac{1}{n}\right) \quad \text{[Math 4]}$$

order to further optimize, an optimal angle $A_m$ is determined that satisfies the following equation $$A_m = \frac{\sin\left(\frac{\theta}{2} - \sin^{-1}\left(n \sin\left(A_m - \sin^{-1}\left(\frac{\sin\left(\frac{\pi}{2} - \alpha\right)}{n}\right)\right)\right)\right)}{n} + \sin^{-1}\left(\frac{1}{n}\right) \quad \text{[Math 5]}$$

$A_m$ being determined by iteration
and setting $A = A_m \pm 2°$ and A being non-zero
Advantageously:
it may be provided that the thermal camera is arranged in front of the insert in such a way that by defining an incident ray tangential to the exterior face, refracted in the insert, and emerging from the interior face of the insert forming an angle $\theta_1$ with the optical axis X, $\theta_1$ is greater than or equal to $0.7\theta/2$, preferably greater than or equal to $0.8\theta/2$ or $0.9\theta/2$, tangential incident ray in the vertical plane that contains X and arriving from a lower area, below the insert
the device has a so-called effective field of view, defined after refraction by the insert, which is at least 20% and even at least 40% or 60% more than with an insert with parallel interior and exterior faces—with A being zero (everything else being equal).

The exterior face may be inscribed within a rectangle or square defining a center M' which is the intersection of the diagonals of said rectangle or square, defining the ray R' incident to the exterior face in a horizontal direction passing through said center M' refracted during its passage through the insert, the ray R' is collected by the pupil and preferably is located at most 5 mm or at most 2 mm away from the center C.

The thermal camera may be of a given volume defined by a contact point CT (an upper corner on the frontal plane of the objective lens or in front of or behind the objective lens) capable of touching the glazing first, or a plate on the internal face of the glazing, or the insert, or a part within the peripheral environment of said glazing, in mounted position in a vehicle.

When the thermal camera pivots upwards (according to the angle T), the contact point CT intervenes at a distance from C with the insert which is smaller than if the thermal camera is horizontal.

In other words, by orienting the thermal camera upwards it may be possible to move it closer to the insert if necessary.

Also preferably, the thermal camera is placed closer than the minimum distance of approach corresponding to that of the thermal camera when horizontal And preferably:
the center C is at less than 30 mm from the interior face
and the point O ("optical" referent) on the internal face passing through the optical axis X is for example at most 5 or 3 mm or 1 mm away from the focal plane of the internal face of the glazing
and/or the point M ("mechanical" referent independent of the thermal camera) on the internal face is at most 5 mm or 3 mm or 1 mm away from the local plane of the interior face of the glazing.

The invention further relates to a road vehicle (automobile) or railroad vehicle, particularly autonomous or semi-autonomous, incorporating said glazed element (particularly a windshield) and even said device as previously defined.

The invention in particular relates to a motor vehicle, particularly autonomous or semi-autonomous, incorporating said glazed element (in particular a windshield) and even said device as previously defined.

Some advantageous but non-limiting embodiments of the present invention are described hereinafter, which of course may be combined as appropriate.

FIG. 1 schematically represents a vehicle with a device 100 comprising a windshield with an insert having non-parallel faces allowing the passage of infrared and a thermal camera in the passenger compartment, in a first embodiment, it is a partial cross-sectional view in a plane passing through the center C of the pupil of the thermal camera.

FIG. 2 schematically represents a partial cross-sectional view of a device 200 comprising a windshield with an insert having non-parallel faces, in a second embodiment.

FIG. 3 schematically represents a partial cross-sectional view of a device 300 comprising a windshield with an insert having non-parallel faces, in a third embodiment.

FIG. 4A schematically represents a partial cross-sectional view of a device 400 comprising a windshield with an insert having non-parallel faces, in a fourth embodiment, it is a partial cross-sectional view in a plane passing through the center C of the pupil of the thermal camera.

FIG. 4B' is a detailed view of FIG. 4B illustrating particular rays R and R'.

FIG. 5 schematically represents a partial cross-sectional view of a device 500 comprising a windshield with an insert having non-parallel faces, in a fifth embodiment.

FIG. 6 represents the deflection of the rays downstream from the insert based on the angle of incidence on the interior face.

FIG. 7 schematically represents a partial cross-sectional view of a device 600 comprising a windshield with an insert having non-parallel faces, in a sixth embodiment.

FIG. 8 represents the effective field-of-view based on the angle A of the insert, and more specifically
curve I represents the total vertical field-of-view based on the angle A of the insert
curve J represents the horizontal field-of-view based on the angle A of the insert
curve K represents the lower vertical field-of-view based on the angle A of the insert
curve L represents the upper vertical field-of-view based on the angle A of the insert.

FIG. 1 schematizes a windshield 100 mounted in a road or railway vehicle according to the invention, in cross-section with a thermal camera 9 placed behind the windshield facing an area preferably located in the central and upper part of the windshield. In this area, the thermal camera 9 can be oriented with a certain angle with respect to the horizontal. In this example, the thermal camera is preferably oriented upwards.

The windshield 100 is a conventional laminated glazing comprising:
- an external glass sheet 1, preferably tinted, for example made of TSA glass and 2.1 mm thick, with exterior face F1 and interior face F2
- and an internal glass sheet 1' (or alternatively, a plastic sheet) for example made of TSA glass (clear or extra clear) and 2.1 mm thick or even 1.6 mm or even less, with exterior face F3 and interior face F4 on the passenger compartment side
- the two glass sheets being bonded to one another by an interlayer made of thermoplastic material 3, most usually polyvinyl butyral (PVB), preferably clear, of submillimeter thickness possibly having a transverse cross-section decreasing in corner shape from top to bottom of the laminated glazing, for example a PVB (RC41 from Solutia or Eastman) of about 0.76 mm thickness, or alternatively if necessary an acoustic PVB (three-layer or four-layer), for example about 0.81 mm thick, for example an interlayer in three PVB sheets.

In a conventional and well-known way, the windshield is obtained by hot lamination of the elements 1, 1' and 3.

The windshield 100 comprises on the exterior face 11 for example (or preferably at F2 12 and/or on face F3 13 or F4 14) preferably an opaque coating black 6 for example, such as a layer of enamel or black lacquer, over all the surface of the glazing arranged facing the device incorporating the thermal camera (therefore, over the entire periphery of the hole), including the housing 8 thereof (plastic, metal, etc.), so as to conceal it. The housing 8 may be fixed to a plate 7 bonded to the face F4 by a glue 80 and to the roof 9. The plate 7 is optional and the housing 8 may be fixed in a different way.

The opaque layer 6 may extend beyond the area with the insert defined below. Optionally the extension (lateral) of the opaque layer forming a strip at the upper edge of the through-hole so that the windshield has an opaque (black) strip along the upper longitudinal edge, or even an opaque frame (black) over the entire periphery.

According to the invention, in the peripheral area facing the thermal camera, the windshield comprises a through-hole 4 between the internal face 11 and the external face 14, the hole delimited by a side wall 10 of the laminated glazing (glass 1/PVB 3/glass 1'), said through-hole comprising:
- an insert 2 made of material transparent in a so-called LB range of wavelengths in the infrared which goes from at least 9.5 μm to 10.5 μm and preferably from 8 to 12 μm, the refractive index n in the LB range, particularly from 1.35 to 4.5
- between the insert and the side wall, means for fastening the insert particularly in the form of a ring 5 made of flexible material, polymer, the fastening means (ring) in particular being bonded to the side wall.

The insert 2 comprises an interior face 21 and an exterior face 22 that are not parallel, preferably flat, forming an angle at the apex A that is non-zero and an edge face 23, the insert having a variable thickness e decreasing toward the upper edge of the glazing in mounted position (on the vehicle),—with e1 the minimum thickness, at the upper edge and e2 the maximum thickness at the lower edge—the thickness e preferably being at most 1 cm or subcentimetric particularly in a range of from 3 to 10 mm.

The exterior face here is flush with the external face (therefore locally the exterior face and the external face are coplanar) or alternatively is set back from the external face.

The insert is preferably circular or quasi-circular in shape. The exterior face (and the interior face) is preferably circular or quasi-circular in shape.

The edge face or side face 23 of the insert facing the side wall of the glazing preferably has sufficient thickness to facilitate maintenance, for example at least 3 mm (toward the top of the glazing).

The interior face 21 forms a non-zero angle AO with (the local plane of) the internal face 14, AO here equals A, the exterior face is coplanar with the external face. In other words, the decrease in thickness toward the top is obtained by the tapered shape of the interior face all or part of which may project from the internal face.

The side face 23, down side, projects toward the passenger compartment.

The circular exterior face is inscribed within a rectangle or square of width Wi and height Di with Di/Wi ratio of at least 0.8 or 0.9 and at most 1.1 or 1.2, preferably Di equal to Wi, with Di at most 35 mm or 25 mm, particularly at least 5 mm or 8 mm, defining a center M' which is the intersection of the diagonals of said rectangle.

The circular interior face is inscribed within a rectangle or square, defining a center M which is the intersection of the diagonals of said rectangle.

The interior face 21 of the insert may, at the highest point, emerge from the internal face (or be flush therewith), and at the lowest point be flush with the internal face of the glazing (or be set back therefrom by at most 5 mm).

The transverse cross-section (passing through a plane perpendicular to the interior and exterior faces passing through M and M') is for example a quadrilateral.

The material of the insert 2 is also preferably transparent in visible light at a reference wavelength of between 500 nm and 600 nm.

It may be transparent in visible light even more preferably at least in a range B going from 550 to 600 nm.

The material of the insert 2 has an infrared transmission of at least 40% or 50% and better still at least 65% in said LB range and a light transmission of at least 30% and better still at least 40% at the reference wavelength and better still in the B range.

The material of the insert 2 particularly polycrystalline is for example chosen from:
- a zinc compound comprising selenium and/or sulfur, or
- a compound comprising barium fluoride.

In particular, the following can be selected:
- a compound comprising a multispectral zinc sulfide, particularly obtained after hot isostatic pressing, particularly including selenium, such as $ZnS_xSe_{1-x}$ with x preferably at least 0.97, in particular the multispectral ZnS
- or a compound comprising a zinc selenide, in particular ZnSe, particularly including sulfur, such as $ZnSe_yS_{1-y}$, with y being at least 0.97
- a compound comprising a barium fluoride particularly including calcium and/or strontium, particularly $Ba_{1-i-j}Ca_jSnF_2$ with i and j preferably at most 0.25 or even $Ba_{1-i}Ca_iF_2$ with i preferably at most 0.25, in particular the $BaF_2$.

Preferably a multispectral ZnS may be chosen, exposed or covered by a protective layer of zinc sulfide or a ZnSe covered by a protective layer of zinc sulfide.

The insert 2 here preferably comprises a mechanical and/or chemical protective layer 22' on the exterior face and optionally on the interior face. It is a coating chosen from among a layer comprising a zinc sulfide, a diamond layer or a DLC layer.

Alternatively, the through-hole 4 may be a notch, therefore a through-hole preferably opening upward.

The through-hole (and the insert) may be in another region of the windshield or even in another glazing of the vehicle.

Alternatively, the glazing of the vehicle may be one-piece.

The thermal camera 9 comprises a circular interior pupil 91, an infrared detection system in the LB range and an objective lens, the thermal camera being defined by:
- a vertical angle of view θ of at least 10° or 20° and in particular at most 60° or 50° or 40°
- an optical axis X passing through the center C of the pupil, forming an angle of inclination T with the horizontal X0, the thermal camera being tilted upward (in mounted position).

Furthermore, a centerline is defined as being the projection in the plane of the internal face of the glazing of the vertical line passing through the center M, (this line goes from the upper edge to the lower edge, thus dividing the interior face into two areas), the camera is positioned in such a way (or "is centered" in the sense that) the optical axis X meets the interior face at least 5 mm or 2 mm from the centerline.

Infrared detection is preferred with a maximum sensitivity in the LB range and even a weak sensitivity above 15 or 14 µm and below 7 or 6 µm.

As an example of thermal camera, the Atom®1024 from the Lynred USA company may be mentioned.

Other integrations of the insert in the windshield may be considered, depending on the thickness of the insert and that of the windshield.

FIG. 2 schematically represents a partial cross-sectional view of a device 200 comprising a windshield with an insert having non-parallel faces, in a second embodiment.

The insert 2 differs from the preceding one in that its thickness, top side of the windshield, is less than that of the windshield. The side face 23 top side partially covers the side wall of the glazing, enclosing the hole top side.

FIG. 3 schematically represents a partial cross-sectional view of a device 300 comprising a windshield with an insert having non-parallel faces, in a third embodiment.

The insert 2 differs from the first one in that (like the preceding one) its thickness top side of the windshield is less than that of the windshield. The side face top side 23 partially covers the side wall of the glazing enclosing the hole top side and in that the interior face 21 bottom side is flush with the internal face instead of projecting toward the passenger compartment. Moreover, the plate 7 is eliminated.

FIG. 4A schematically represents a partial cross-sectional view of a device 400 comprising a windshield with an insert having non-parallel faces, in a fourth embodiment, it is a partial cross-sectional view in a plane passing through the center C of the pupil of the thermal camera.

The so-called thermal camera 9 comprises a circular (input) pupil 91, an infrared detection system in the LB range and an objective lens, the thermal camera being defined by:
- a vertical angle of view θ of at least 10° or 20° and in particular at most 60° or 50° or 40°
- an optical axis X passing through the center C of the pupil, preferably forming an angle of inclination T with the horizontal X0 passenger compartment side, the thermal camera being tilted upward (in mounted position).

The thermal camera 9 points upward in such a way that downstream from the insert (exterior face side), the optical axis X impacted by the insert (otherwise definable as the optical axis of the thermal camera/insert assembly) is again horizontal or nearly so.

The lowest ray (represented by two arrows) coming from the center C of the pupil arriving on the interior face 21 with an angle of incidence is greater than the angle of incidence is of the highest ray (represented by three arrows) coming from the center C of the pupil, the lowest ray is always more deflected downward exiting the insert than the highest ray, which gives the overall effect of increasing the vertical angle of view of the thermal camera.

Advantageously, by defining a ray (central) R incident to the exterior face in a horizontal direction, forming an angle $D_0$ with the optical axis X, R then being refracted during its passage through the insert, $D_0$ being the angle of deflection by the insert of the ray R and defined by:

$$D_O = \frac{\pi}{2} - \alpha + \sin^{-1}\left(n \sin\left(A - \sin^{-1}\left(\frac{\sin\left(\frac{\pi}{2} - \alpha\right)}{n}\right)\right)\right) - A \quad \text{[Math 6]}$$

chosen such that T equals $D_0 \pm 10°$ while remaining positive or $D_0 \pm 5°$ or else $D_0 \pm 1°$.

It may be provided that T forms an angle of at most 30°, better at most 20° with the horizontal.

The choice of the angle at the apex A can be dictated by the following consideration: if A is too large then the lowest rays (coming from the center C of the pupil) do not exit the insert and are trapped by total internal reflection (confined within the insert)) which will limit the possible increase of the field of view. There is therefore an optimal angle $A_m$ beyond which there is no improvement.

In defining the lowest ray coming from the center C of the pupil forming an angle is with the interior face $$i_B = \frac{\pi}{2} + \frac{\theta}{2} - T - \alpha - A \quad \text{[Math 7]}$$

And $$A \leq \frac{\sin i_B}{n} + \sin^{-1}\left(\frac{1}{n}\right) \quad \text{[Math 8]}$$

order to further optimize, an optimal angle $A_m$ is determined that satisfies the following equation $$A_m = \frac{\sin\left(\frac{\theta}{2} - \sin^{-1}\left(n \sin\left(A_m - \sin^{-1}\left(\frac{\sin\left(\frac{\pi}{2} - \alpha\right)}{n}\right)\right)\right)\right)}{n} + \sin^{-1}\left(\frac{1}{n}\right) \quad \text{[Math 9]}$$

determined by iteration
and A is set equal to $A_m$.

FIG. 4B' is a detailed view of FIG. 4A illustrating particular rays R and R'.

By defining the ray R' incident to the exterior face 22 in a horizontal direction passing through said center M' refracted during its passage through the insert, the ray R' is collected by the pupil at C' and preferably is located at most 5 mm or even at most 2 mm away from the center C.

By defining the ray R incident to the exterior face 22 in a horizontal direction passing through O' refracted during its passage through the insert, the ray R exiting at O is collected by the pupil at the center C. R' is deflected by an angle Do by the insert.

FIG. 5 schematically represents a view in partial cross-section of a device 500 comprising a windshield with an insert having non-parallel faces, in a fifth embodiment, it is a partial cross-sectional view in a plane passing through the center C of the pupil of the thermal camera.

If the following parameters are selected: θ field of view (FOV) of the thermal camera equal to 24°, angle of inclination a equal to 33°, refractive index n equal to 2.2 in the LB range, (diameter of the insert equal to 10 mm), angle of the insert A equal to 8°, angle of inclination T equal to Do, that is to say 15.8°.

We have:

$$i_S = \frac{\pi}{2} - \frac{\theta}{2} - T - \alpha - A \quad \text{[Math 10]}$$

and $$i_B = \frac{\pi}{2} + \frac{\theta}{2} - T - \alpha - A \quad \text{[Math 11]}$$

The deflection of the highest ray is equal to 12° that of the lowest ray is equal to 30°.

Thus the θ (vertical FOV) of the thermal camera changes from 24° to an effective value (after passing through the insert of 42° (equal to 24−12+30) or a gain of +75%.

More generally, the graph of FIG. 6 is a curve that shows the deflection of the rays based on the angle of incidence on the interior face of the insert (for n=2.2 and A=8°).

The curve is clearly increasing and the lowest ray arriving with a greater angle of incidence than the highest ray, it is clearly always more deflected downward than the highest ray, which gives the overall effect of increased vertical angle of view of the thermal camera.

However, there is a limit value to the angle A beyond which the lowest ray no longer emerges from the insert but is in total internal reflection on the external face and is therefore lost.

In fact, the angle of incidence is of the lowest ray on the internal face must meet the following condition:

$$\sin^{-1}\left[n\left(A - \sin^{-1}\left(\frac{1}{n}\right)\right)\right] \leq i_B \quad \text{[Math 12]}$$

Or the condition on A:

$$A \leq \frac{\sin i_B}{n} + \sin^{-1}\left(\frac{1}{n}\right) \quad \text{[Math 13]}$$

Where:

$$i_B = \frac{\pi}{2} + \frac{\theta}{2} - T - \alpha - A \quad \text{[Math 14]}$$

This is shown in FIG. 7 which schematically represents a view in partial cross-section of a device 600 comprising a windshield with an insert having non-parallel faces, in a sixth embodiment; it is a partial cross-sectional view in a plane passing through the center C of the pupil of the thermal camera.

If the following parameters are chosen: field-of-view (FOV) θ equal to 24°, angle α equal to 33°, refractive index n equal to 2.2, (diameter of the insert D equal to 10 mm), angle of the insert A equal to 20° (A too large to be optimal), T is equal to Do and has a value of 31.7°.

The lowest ray is in total internal reflection in the insert 2 and cannot exit.

It may be provided that the thermal camera is arranged facing the insert in such a way that by defining an incident ray tangential to the exterior face, refracted in the insert, and emerging from the interior face of the insert forming an angle $\theta_1$ with the optical axis X, $\theta_1$ is greater than or equal to 0.7θ/2, preferably greater than or equal to 0.8θ/2 or 0.9θ/2, tangential incident ray in the vertical plane that contains X and arriving from a lower area, below the insert.

FIG. 8 represents the effective field-of-view based on the angle A of the insert, (for n=2.5 and θ=27°).

And more specifically:
curve I represents the total vertical field-of-view based on the angle A of the insert
curve J represents the horizontal field-of-view based on the angle A of the insert, which remains constant
curve K represents the lower vertical field-of-view based on the angle A of the insert
curve L represents the upper vertical field-of-view based on the angle A of the insert.

It can be seen that the vertical field of view begins by increasing then saturates toward A equals 10° due to this total internal reflection effect.

In a seventh embodiment, n is decreased, and the angle of the optimal prism is then greater.

If the following parameters are chosen θ field-of-view (FOV) of the camera equal to 24°, angle α equal to 33°, refractive index n equal to 1.5, D equal to 10 mm, angle of the insert A equal to 20°, inclination T is equal to Do 15.8°.

The θ (vertical FOV) of the thermal camera changes from 24° to an effective value (after passing through the insert) of 42° or a gain of about +74%.

The invention claimed is:

1. A glazed element comprising:
   a vehicle glazing having an external main face intended to be oriented toward an exterior and an internal main face intended to be on a passenger compartment side, the glazing comprising a through-hole between the internal main face and the external main face, the through-hole being delimited by a side wall of the glazing, and
   in said through-hole, an insert made of material that is transparent in range of wavelengths in an infrared spectrum ranging at least from 9.5 μm to 10.5 μm, the insert being made of material of refractive index n in said range of wavelengths, with an interior face and an exterior face,
   wherein the interior and exterior faces of the insert form a non-zero angle at an apex A, the insert having a thickness e that is variable and decreasing toward an upper edge of the glazing.

2. The glazed element according to claim 1, wherein the variable thickness e is within a range of from 3 to 10 mm.

3. The glazed element according to claim 1, wherein the interior face of the insert forms a non-zero angle with the internal main face of the glazing and/or the exterior face of the insert is parallel or coplanar with the external main face of the glazing or forms an angle of at most 2° with the external main face of the glazing.

4. The glazed element according to claim 1, wherein the exterior face of the insert is flush with or set back from the external main face of the glazing.

5. The glazed element according to claim 1, wherein an angle of the apex A is at least 2° and at most 30°.

6. The glazed element according to claim 1, wherein a diameter of the exterior face of the insert is at most 35 mm.

7. The glazed element according to claim 1, wherein the exterior face of the insert is inscribed within a rectangle of width Wi and height Di with Di/Wi ratio of at least 0.8 and at most 1.1 with Di at most 35 mm and at least 5 mm.

8. The glazed element according to claim 1, wherein the material of the insert has an infrared optical transmission of at least 30% in said range of wavelengths and a light transmission of at least 25% at a reference wavelength of between 500 nm and 600 nm.

9. The glazed element according to claim 1, wherein the glazing forms a laminated glazing, the laminated glazing comprising a first glass sheet with said external main and an opposite face and a second glass or plastic sheet with said internal main face on the interior side of the passenger compartment, the first and second sheets being bonded by a lamination interlayer made of a polymer material.

10. A device comprising:
   the glazed element according to claim 1, the vehicle glazing having an inclination defined by an angle α relative to a horizontal in mounted position, and
   a thermal camera, arranged on a side of the internal main face, facing the insert, in such a way as to receive electromagnetic radiation after passage through the insert, the thermal camera comprising a pupil and an infrared detection system in said range of wavelengths, the thermal camera being defined by a vertical angle of view θ of at least 10°.

11. The device according to claim 10, wherein the thermal camera has an optical axis X passing through a center C of the pupil, the thermal camera forming a positive angle of inclination T with a horizontal axis X0, upstream from the internal main face, the thermal camera being tilted upward.

12. The device according to claim 11, wherein, when a ray R is incident to the exterior face of the insert in a horizontal direction, R then being refracted during its passage through the insert, an angle $D_0$ of deflection by the insert of the ray R is defined by:

$$D_O = \frac{\pi}{2} - \alpha + \sin^{-1}\left(n \sin\left(A - \sin^{-1}\left(\frac{\sin\left(\frac{\pi}{2} - \alpha\right)}{n}\right)\right)\right) - A$$

T is chosen such that T equals $D_0 \pm 10°$ while remaining positive.

13. The device according to claim 11, wherein the angle of inclination T is at most 30° with the horizontal X0.

14. The device according to claim 10, wherein the thermal camera is arranged facing the insert so that by defining an incident ray tangential to the exterior face of the insert, refracted in the insert, and emerging from the interior face of the insert forming an angle $\theta_1$ with the optical axis X, $\theta_1$ is greater than or equal to 0.7θ/2, tangential incident ray in the vertical plane that contains X and arriving from a lower area, below the insert.

15. The device according to claim 10, wherein the exterior face of the insert is inscribed within a rectangle defining a center M' which is an intersection of diagonals of said rectangle, defining a ray R' incident to the exterior face of the insert in a horizontal direction passing through said center M' refracted during its passage through the insert, the ray R' is collected by the pupil and is located at most 5 mm away from a center C of the pupil.

16. The device according to claim 10, wherein the thermal camera is tilted upward and the camera is placed nearer than a minimum approach distance corresponding to that of the camera when horizontal.

17. The device according to claim 11, wherein a range of values of $A_i$ is determined that satisfy the following equation:

$$A_i \leq \frac{\sin\left(\frac{\pi}{2} + \frac{\theta}{2} - T' - \alpha - A_i\right)}{n} + \sin^{-1}\left(\frac{1}{n}\right)$$

said range $A_i$ being determined by iteration
and A being set within a range of from a non-zero value to $A_i \pm 2°$
T' being an angle of the thermal camera with the horizontal and is zero or equal to T.

18. The device according to claim 10, wherein an optimal angle $A_m$ is determined that satisfies the following equation:

$$A_m = \frac{\sin\left(\frac{\theta}{2} - \sin^{-1}\left(n \sin\left(A_m - \sin^{-1}\left(\frac{\sin\left(\frac{\pi}{2} - \alpha\right)}{n}\right)\right)\right)\right)}{n} + \sin^{-1}\left(\frac{1}{n}\right)$$

$A_m$ being determined by iteration
and A=$A_m \pm 2°$ and A being non-zero are set.

19. The device according to claim 10, wherein the device has an effective vertical field-of-view, defined after refraction by the insert, which is at least 20% more than with an insert having parallel interior and exterior faces.

20. A road or railway vehicle comprising said glazed element according to claim 1.

* * * * *